US012784928B2

(12) United States Patent
Gross et al.

(10) Patent No.: US 12,784,928 B2
(45) Date of Patent: Nov. 3, 2026

(54) PORTABLE NUCLEAR POWER SYSTEM

(71) Applicant: Nucube Energy, Inc., Pasadena, CA (US)

(72) Inventors: William Tod Gross, Pasadena, CA (US); Andrea Pedretti, Thousand Oaks, CA (US)

(73) Assignee: Nucube Energy, Inc., Pasadena, CA (US)

( * ) Notice: Subject to any disclaimer, the term of this patent is extended or adjusted under 35 U.S.C. 154(b) by 0 days.

(21) Appl. No.: 18/849,145

(22) PCT Filed: Mar. 29, 2023

(86) PCT No.: PCT/US2023/016759
§ 371 (c)(1),
(2) Date: Sep. 20, 2024

(87) PCT Pub. No.: WO2023/200592
PCT Pub. Date: Oct. 19, 2023

(65) Prior Publication Data

US 2025/0210214 A1 Jun. 26, 2025

Related U.S. Application Data

(60) Provisional application No. 63/325,915, filed on Mar. 31, 2022.

(51) Int. Cl.
*G21H 1/12* (2006.01)
*F02G 1/055* (2006.01)
(Continued)

(52) U.S. Cl.
CPC ............... *G21H 1/12* (2013.01); *F02G 1/055* (2013.01); *G21C 3/626* (2013.01); *G21C 5/126* (2013.01); *G21C 11/00* (2013.01)

(58) Field of Classification Search
CPC ........... G21H 1/12; F02G 1/055; F02G 1/043; G21C 3/626; G21C 5/126; G21C 11/00
See application file for complete search history.

(56) References Cited

U.S. PATENT DOCUMENTS

2011/0259399 A1 10/2011 Shinkai et al.
2015/0228363 A1 8/2015 Dewan et al.
(Continued)

FOREIGN PATENT DOCUMENTS

CA 3 187 232 A1 2/2022
CN 201349188 Y 11/2009
(Continued)

OTHER PUBLICATIONS

International Search Report and Written Opinion dated Dec. 18, 2023, received in International Patent Application No. PCT/US2023/016759, in 11 pages.
(Continued)

*Primary Examiner* — Angelo Trivisonno
(74) *Attorney, Agent, or Firm* — Knobbe, Martens, Olson & Bear LLP

(57) ABSTRACT

A portable nuclear power system includes a nuclear reactor. The nuclear reactor includes a core comprising a vessel housing a nuclear fuel that produces radiation, a sleeve of a high temperature moderator material disposed circumferentially about the core, and a neutron screen disposed circumferentially about the sleeve. The portable nuclear power system generates electricity using heat received from the nuclear reactor and has one or more cooling units in thermal communication with the electricity generating unit.

24 Claims, 7 Drawing Sheets

(51) Int. Cl.

| | |
|---|---|
| ***G21C 3/62*** | (2006.01) |
| ***G21C 5/12*** | (2006.01) |
| ***G21C 11/00*** | (2006.01) |

(56) References Cited

U.S. PATENT DOCUMENTS

| | | | | |
|---|---|---|---|---|
| 2020/0027587 | A1* | 1/2020 | Venneri .................. | G21C 3/626 |
| 2022/0051825 | A1* | 2/2022 | Botha .................... | G21C 15/18 |

FOREIGN PATENT DOCUMENTS

| | | | |
|---|---|---|---|
| CN | 109243653 | A | 1/2019 |
| CN | 111128413 | A | 5/2020 |
| CN | 112331369 | A | 2/2021 |
| CN | 215 931 237 | U | 3/2022 |
| CN | 115163436 | A | 10/2022 |
| CN | 116488509 | A | 7/2023 |
| JP | 2941825 | B2 | 8/1999 |
| KR | 10-0999839 | B1 | 12/2010 |
| KR | 10-2152188 | B1 | 9/2020 |

OTHER PUBLICATIONS

Extended European Search Report dated May 19, 2026, received in European Patent Application No. 23788748.4, in 10 pages.

* cited by examiner

PORTABLE NUCLEAR POWER SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to a power generation system, and more particularly to a portable nuclear power reactor.

Description of the Related Art

Green energy systems (e.g., that do not generate greenhouse gases, such as carbon dioxide) continue to be developed and implemented to decarbonize the energy sector. Such systems include solar energy and wind energy. However, such systems are limited in that they cannot continuously produce power. Nuclear reactors can generate power without generating greenhouse gases. However, commercial nuclear power plants are costly and require a long time to build (e.g., generating electricity via a turbine driven by steam generated by the nuclear reactor of the nuclear power plant).

SUMMARY

In accordance with one aspect of the disclosure, a small, compact portable nuclear plant is provided that can be transported and/or implemented where needed to generate power (e.g., can be implemented in a short time frame and at much lower cost than commercial nuclear plants). The portable nuclear plant can generate, in some examples, between 0.5 MW and about 5 MW of power.

In accordance with one aspect of the disclosure, a portable nuclear power system is provided. The portable nuclear power system comprises a nuclear reactor. The nuclear reactor comprises a core comprising a vessel housing a nuclear fuel that produces radiation, a sleeve of a high temperature moderator material disposed circumferentially about the core, and a neutron screen disposed circumferentially about the sleeve. The portable nuclear power system also comprises one or more thermal photovoltaic panels circumferentially arranged around the neutron screen, the one or more thermal photovoltaic panels configured to absorb thermal radiation received from the high temperature moderator material via the neutron screen and to generate electricity therefrom. The portable nuclear power system also comprises one or more cooling units in thermal communication with the one or more thermal photovoltaic panels, the one or more cooling units being operable to cool the thermal photovoltaic panels.

In accordance with another aspect of the disclosure, a portable nuclear power system is provided. The portable nuclear power system comprises a nuclear reactor. The nuclear reactor comprises a core comprising a vessel housing a nuclear fuel that produces radiation, a sleeve of a high temperature moderator material disposed circumferentially about the core, and a neutron screen disposed circumferentially about the sleeve. The portable nuclear power system also comprises a flow loop operable to recirculate a gas through the core to cool the core. The portable nuclear power system also comprises a Stirling engine comprising a hot side heat exchanger in thermal communication with the gas in the flow loop and configured to receive heat therefrom. The portable nuclear power system also comprises a cooling unit in thermal communication with a cold side heat exchanger of the Stirling engine, the Stirling engine configured to generate electricity.

In accordance with another aspect of the disclosure, a portable nuclear power system is provided. The portable nuclear power system comprises a nuclear reactor. The nuclear reactor comprises a core comprising a vessel housing a nuclear fuel that produces radiation, a sleeve of a high temperature moderator material disposed circumferentially about the core, and a neutron screen disposed circumferentially about the sleeve. The portable nuclear power system also comprises means for generating electricity from heat received from the nuclear reactor, and one or more cooling units in thermal communication with said means and operable to cool said means.

DETAILED DESCRIPTION

Figure 1:
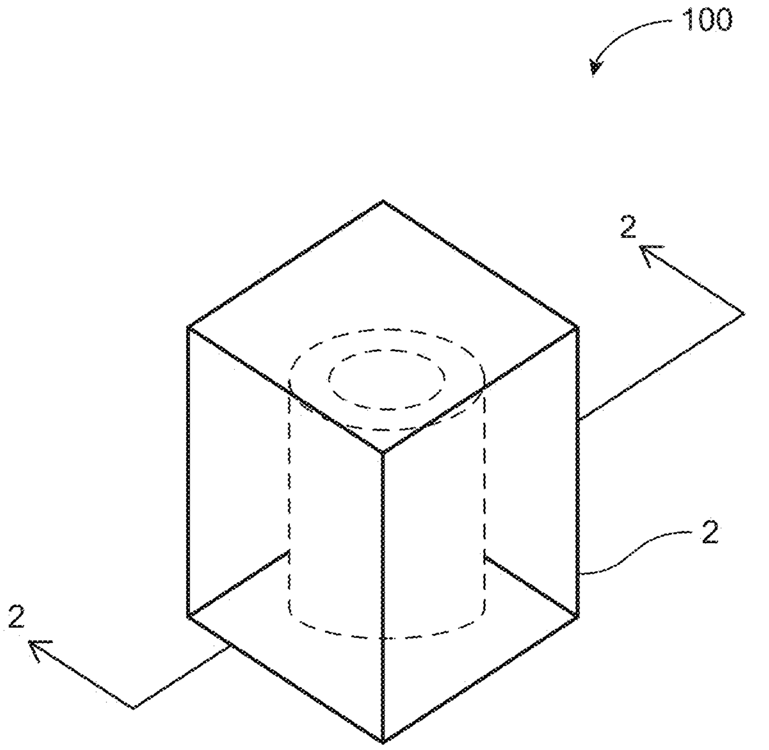
FIG. 1 is a schematic perspective view of a portable nuclear power system.
Figure 2:
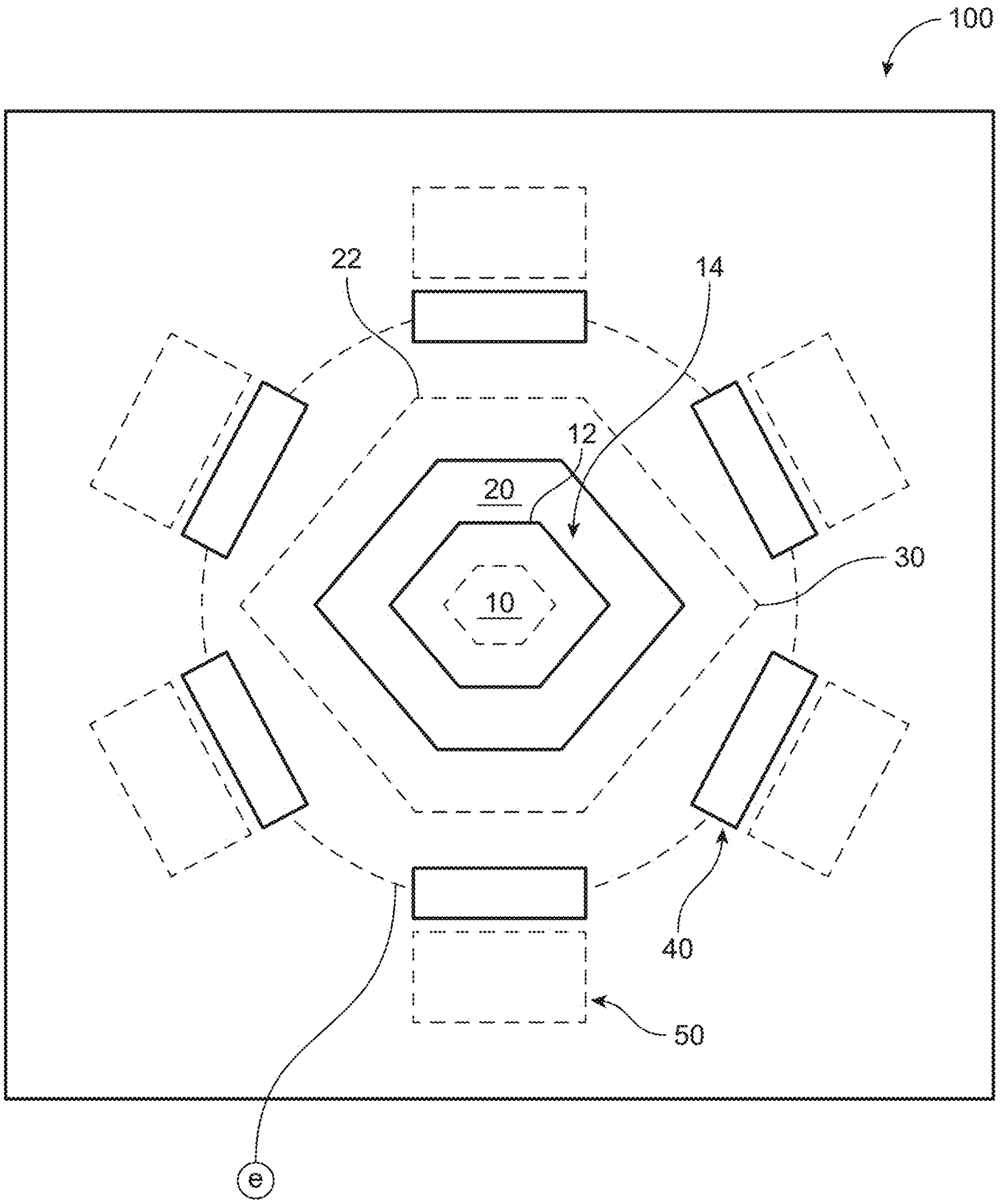
FIG. 2 is a schematic cross-sectional view about line 2-2 of the portable nuclear power system in FIG. 1.

FIGS. 1-2 shows a portable nuclear power system 100. In some implementations, the portable nuclear power system 100 can generate between about 0.5 MW and about 5 MW of power. The portable nuclear power system 100 has a vessel 12 containing (e.g., circumscribing, completely enclosing) a nuclear fuel 10 (e.g., the vessel 12 and nuclear fuel 10 forming a core 14). In one implementation, the nuclear fuel 10 can include Triso (e.g., tri-structural isotropic particle fuel or Triso particles), which can be made of uranium, carbon and oxygen fuel kernels. In other implementations, the nuclear fuel 10 can be uranium oxide housed in tubes. The nuclear fuel 10 in the core 14 generates nuclear radiation (e.g., ionizing radiation, such as gamma rays). The kernels can be encapsulated (e.g., in layers of carbon and ceramic-based materials that prevent the release of radioactive fission products). A high temperature moderator and energy radiator 20 (hereafter "the moderator") surrounds (e.g., circumscribes, completely encloses, encapsulates) the core 14 (e.g., as a sleeve disposed about the core 14). In one implementation, the moderator 20 includes graphite. The moderator 20 can absorb nuclear radiation generated by the core 14 and re-radiate heat. Optionally, the moderator 20 is surrounded by a vessel wall 22. The moderator 20 can be contained (e.g., surrounded, circumscribed, enclosed) by a neutron screen 30.

With continued reference to FIGS. 1-2, one or more (e.g., multiple, a plurality of) thermal photovoltaic (TPV) panels 40 (or TVP cells) can be disposed at least partially about (e.g., surround, circumscribe, be spaced circumferentially about) the neutron screen 30. The neutron screen 30 advantageously absorbs or reflects neutrons (e.g., depending on the material and position of the neutron screen 30) to inhibit (e.g. prevents) neutrons from passing to the TVP panels 40 to thereby inhibit (e.g. prevent) damage to the TPV panels 40 (e.g., damage to the crystal structure of the TPV panels 40 that may decrease efficiency of the TPV panels 40). Reflection of neutrons by the neutron screen 30 can increase the fission rate in the core 14. Absorption of neutrons by the neutron screen 30 can decrease the fission rate in the core 14. Therefore the neutron screen 30 can operate to tune the reaction rate in the core 14 and adjust the power generated by the portable nuclear power system 100.

The TVP panel(s) 40 can be spaced from the neutron screen 30 to inhibit (e.g., prevent) conduction and convection heat transfer (e.g., only allow radiation heat transfer) between the neutron screen 30 and the TVP panel(s) 40. In one implementation, where a space between the neutron screen 30 and the TVP panel(s) 40 is filled with a gas, the TVP panel(s) 40 can be spaced approximately 200 mm from the neutron screen 30. In another implementation, where the space between the neutron screen 30 and the TVP Panel(s) 40 is under vacuum, the TVP panel(s) 40 can be disposed much closer than 200 mm to the neutron screen 40 (e.g., between 50-95% closer). The TPV panel(s) 40 can absorb the thermal radiation radiated by the moderator 20 and/or neutron screen 30. The TPV panel(s) 40 and convert the thermal radiation it receives from the moderator 20 and/or the neutron screen 30 into (e.g., directly into) electricity that can be provided, for example, to an electric grid via an electricity output (e). In one implementation, the TPV panel(s) 40 are electrically connected to each other and to the electricity output (e). The portable nuclear power system 100 can include one or more cooling units 50 in thermal communication with (e.g. attached to) the TVP panel(s) 40 cool the TVP panel(s) 40 (e.g., to facilitate operation of the TVP panel(s) 40 at a desired temperature or within a desired temperature range, to regulate a temperature of the TVP panel(s) 40 to inhibit or prevent damage to the TVP panel(s) 40 during operation). In one implementation, each TVP panel 40 has an associated cooling unit 50. The structure of the cooling unit 50 is further described below. The portable nuclear power system 100 includes an outer housing 2 disposed about (e.g., surrounding, circumscribing, enclosing) the core 14, moderator 20, neutron screen 30, TVP panel(s) 40 and cooling unit(s) 50. The portable nuclear power system 100 is advantageously small and compact and can produce electricity with few or no moving parts.

Figure 3:
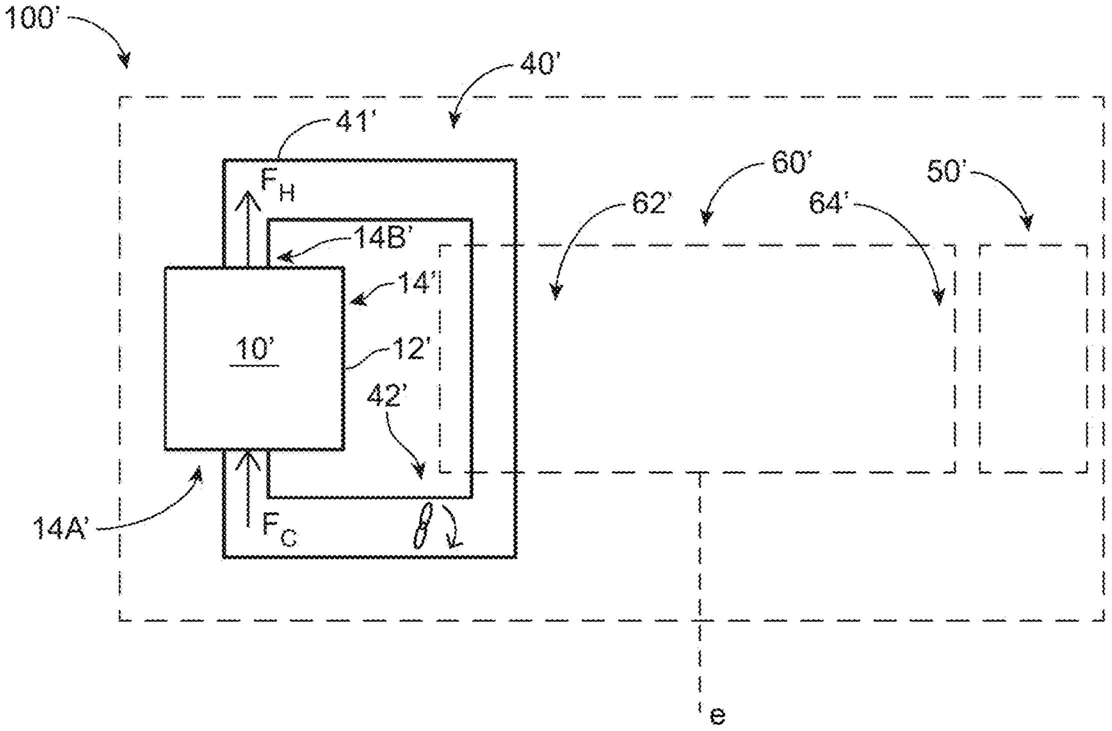
FIG. 3 is a schematic view of a portable nuclear power system.
Figure 4:
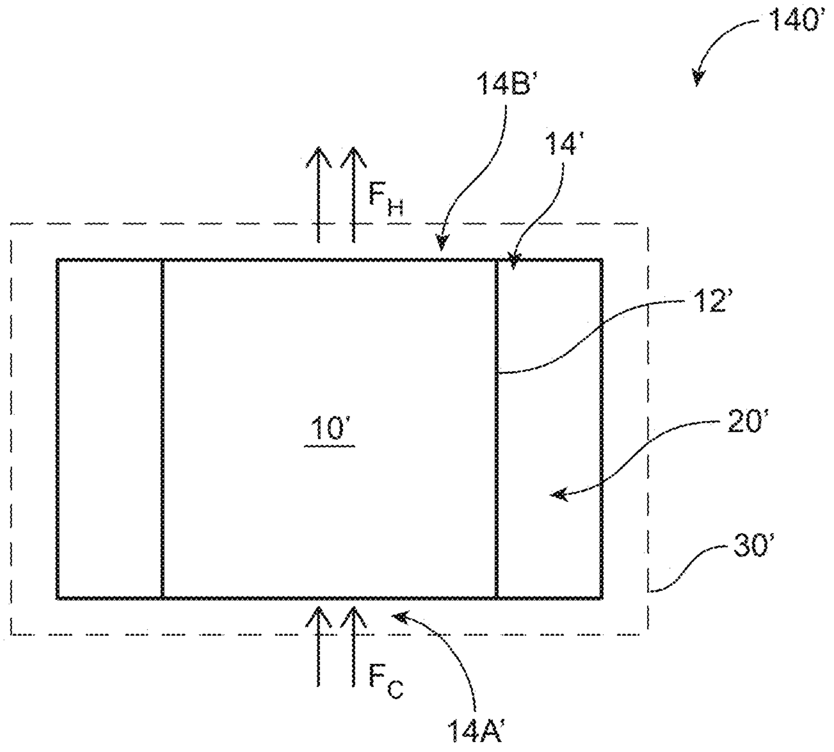
FIG. 4 is a schematic view of a nuclear core of the portable nuclear power system in FIG. 3.

FIGS. 3-4 show schematic views of a portable nuclear power system 100' and core 14'. Some of the features of the portable nuclear power system 100' and core 14' are similar to features of the portable nuclear power system 100 and core 14 in FIGS. 1-2. Thus, reference numerals used to designate the various components of the portable nuclear power system 100' and core 14' are identical to those used for identifying the corresponding components of the portable nuclear power system 100 and core 14 in FIGS. 1-2, except that a "'" has been added to the numerical identifier. Therefore, the structure and description for the various features of the portable nuclear power system 100 and core 14 and how it's operated and controlled in FIGS. 1-2 are understood to also apply to the corresponding features of the portable nuclear power system 100' and core 14' in FIGS. 3-4, except as described below.

The portable nuclear power system 100' differs from the portable nuclear power system 100 in that the portable nuclear power system 100' excludes TPV panels. Instead, the portable nuclear power system 100' includes a Stirling engine 60' between the core 14' and one or more cooling units 50'. As shown in FIG. 3, the portable nuclear power system 100' includes a flow loop 40' that includes a conduit 41' in fluid communication with opposite ends of the core 14' (e.g., with an inlet 14A' and an outlet 14B' of the core 14'). A gas, for example helium, is recirculated through the core 14' via the conduit 41'. Optionally, one or more fans 42' can operate to facilitate (e.g., drive) the flow of the gas through the conduit 41'. In other implementations, a coolant that does not become radioactive (e.g., does not absorb neutrons) can be recirculated through the core 14'. In one example, the coolant can be a fluid including metallic sodium or potassium.

Figure 3A:
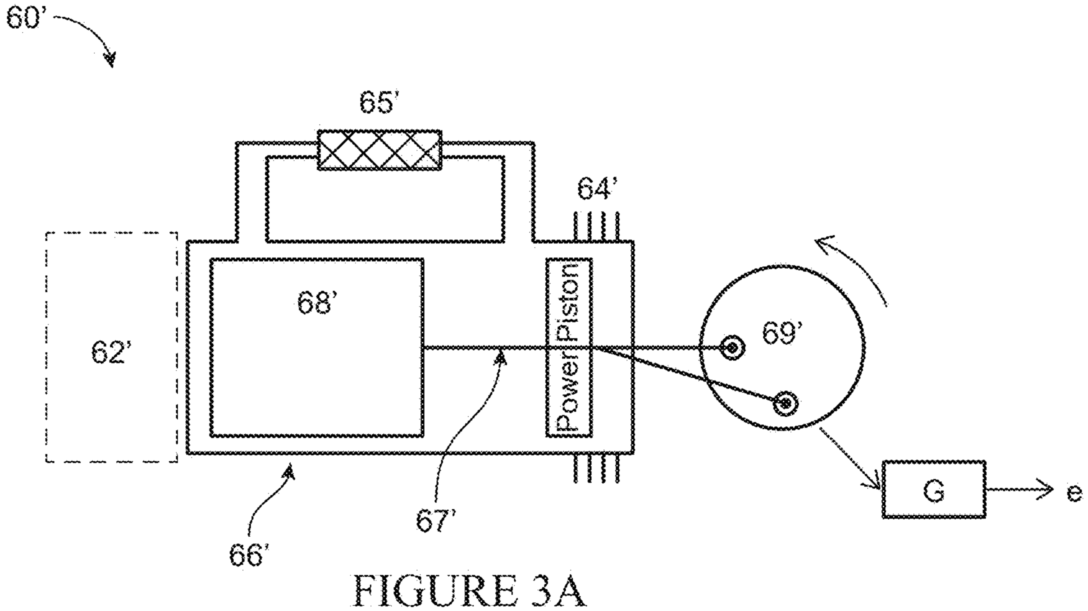
FIG. 3A is a schematic view of a Stirling engine of the portable nuclear power system of FIG. 3.

FIG. 3A shows an example Stirling engine 60' that can be implemented in the portable nuclear power system 100'. The Stirling engine 60' can include a hot side heat exchanger 62' (e.g., a tube-in-tube heat exchanger, plate heat exchanger), a cold side heat exchanger 64' (e.g., a tube-in-tube heat exchanger, plate heat exchanger), a cylinder 66' between and in fluid communication with the hot side heat exchanger 62' and the cold side heat exchanger 64', and a piston 68' (or displacer) that moves within the cylinder 66' and is coupled to a flywheel 69' via a lever 67'. Movement of the piston 68' within the cylinder 66' causes the rotation of the flywheel 69', which generates electricity via a generator G. The electricity can be provided, for example, to an electric grid via an electricity output (e). The Stirling engine 60' is a closed system with a working fluid (e.g., a gas) contained within the cylinder 66'. The power piston compresses and expands the working fluid (e.g., gas), while the piston 68' (displacer piston) moves the working fluid (e.g., gas) between the hot and cold regions of the cylinder 66'. The Stirling engine 60' can include a regenerator 65' (e.g., heat exchanger) between the hot and cold sides of the system and can increase the efficiency of the Stirling engine 60'. However, other suitable Stirling engine designs can be implemented in the portable nuclear power system 100'.

The hot side heat exchanger 64' is in thermal communication with the flow loop 40' and the cold side heat exchanger 64' is in thermal communication with one or more cooling units 50'. In operation, the gas (e.g. helium) flows through the core 14' where it is heated by the core 14'. In one example, the core 14' operates at 600° C., so the gas flows Fc into the core 14' via the inlet 14A', can be heated to approximately 600° C. in the core 14' and flows Fh out of the outlet 14B' of the core 14'. The heated gas transfers heat to the working fluid of the Stirling engine 60' via the hot side heat exchanger 62'. For example, the heated gas can flow through one or more passages of the hot side heat exchanger 62' and the working fluid can flow through other passages in the hot side heat exchanger 62'. In one example, where the heated gas enters the hot side heat exchanger 62' at 600° C., it can exit the hot side heat exchanger 62' at 550° C. or more, so that the temperature difference (between the inlet and outlet of the hot side heat exchanger 62') for the gas is small. The working fluid of the Stirling engine 60' is heated via the hot side heat exchanger 62' and expands, causing the piston 68' to move in one direction and rotate the flywheel 69' via the lever 67', the rotation of the flywheel 69' generating electricity via the generator G. The working fluid cools (via the cold side heat exchanger 64') and the piston 68' moves in the opposite direction, again rotating the flywheel 69' via the lever 67', the rotation of the flywheel 69' generating electricity via the generator G. The cold side heat exchanger 64' cools the working fluid via thermal transfer with the cooling unit(s) 50'. Further details on the cooling unit 50' is provided below.

Figure 5:
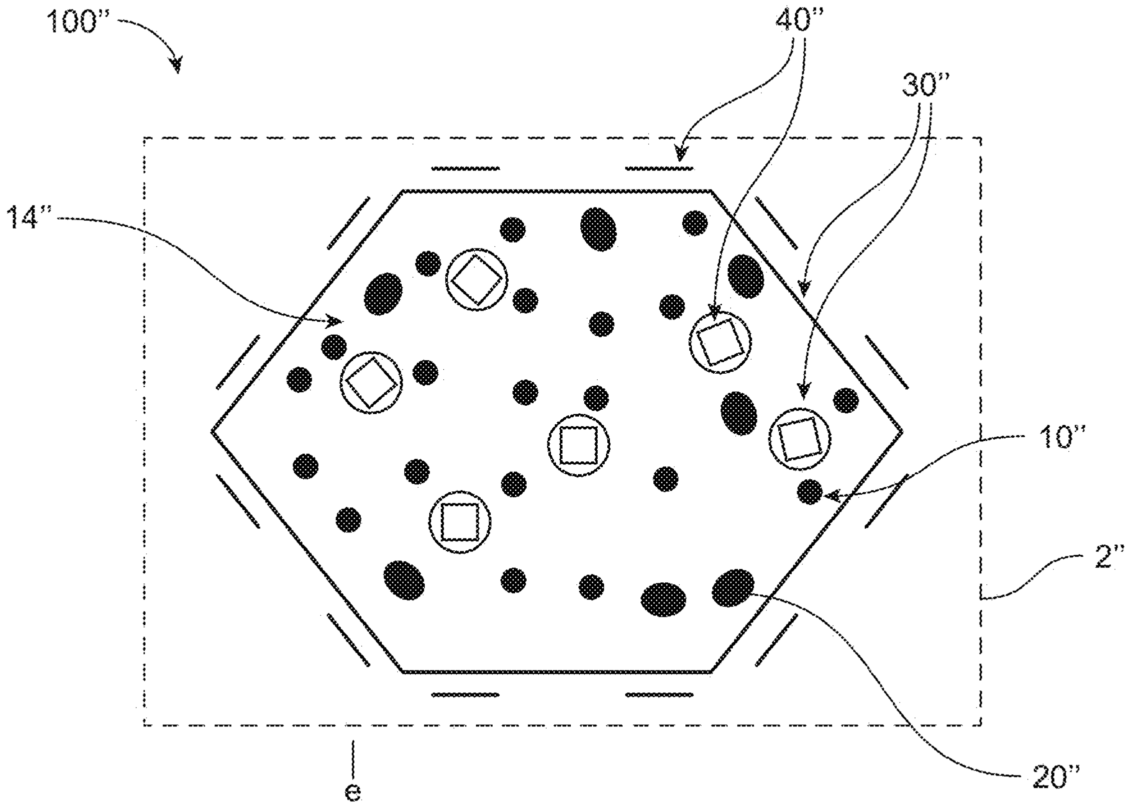
FIG. 5 is a schematic cross-sectional view of a portable nuclear power system.

FIG. 5 shows a schematic cross-sectional view of a portable nuclear power system 100". Some of the features of the portable nuclear power system 100" are similar to features of the portable nuclear power system 100 in FIGS. 1-2. Thus, reference numerals used to designate the various components of the portable nuclear power system 100" are identical to those used for identifying the corresponding components of the portable nuclear power system 100 in FIGS. 1-2, except that a """ has been added to the numerical identifier. Therefore, the structure and description for the various features of the portable nuclear power system 100 and how it's operated and controlled in FIGS. 1-2 are understood to also apply to the corresponding features of the portable nuclear power system 100" in FIG. 5, except as described below.

The portable nuclear power system 100" differs from the portable nuclear power system 100 in that the TVP panels 40" are arranged about (e.g., spaced from and surrounding) the neutron screen 30" as well as within the core 14" interspersed among the nuclear fuel 10" (e.g., which can be in the form of pellets or fuel rods, for example filled with uranium oxide). The TVP panels 40" can be cooled with cooling units (such as cooling units 50 described herein). Moderator 20" can also be disposed in the core 14" (e.g., interspersed) among the nuclear fuel 10" and TVP panels 20".

Figure 6:
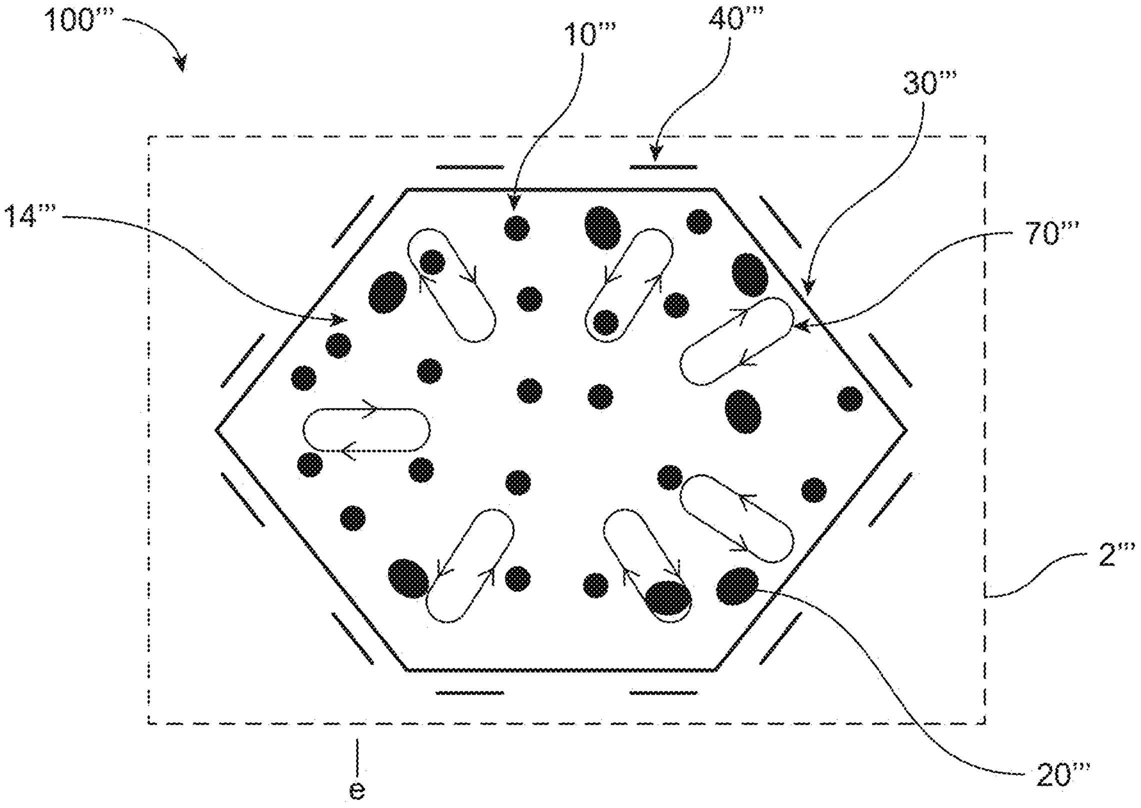
FIG. 6 is a schematic cross-sectional view of a portable nuclear power system.

FIG. 6 shows a schematic cross-sectional view of a portable nuclear power system 100'''. Some of the features of the portable nuclear power system 100''' are similar to features of the portable nuclear power system 100 in FIGS. 1-2. Thus, reference numerals used to designate the various components of the portable nuclear power system 100''' are identical to those used for identifying the corresponding components of the portable nuclear power system 100 in FIGS. 1-2, except that a "'''" has been added to the numerical identifier. Therefore, the structure and description for the various features of the portable nuclear power system 100 and how it's operated and controlled in FIGS. 1-2 are understood to also apply to the corresponding features of the portable nuclear power system 100''' in FIG. 6, except as described below.

The portable nuclear power system 100''' differs from the portable nuclear power system 100 in that one or more heat pipes 70''' are located in the core 14''' and operable to carry heat toward and outer region of the core 14''', which advantageously homogenizes the temperature of the core 14''' that the TVP panels 40''' are exposed to. The heat pipes 70''' are interspersed among the nuclear fuel 10''' (e.g., which can be in the form of pellets or fuel rods, for example filled with uranium oxide). Moderator 20''' can also be disposed in the core 14''' (e.g., interspersed) among the nuclear fuel 10'''.

Figure 7A:
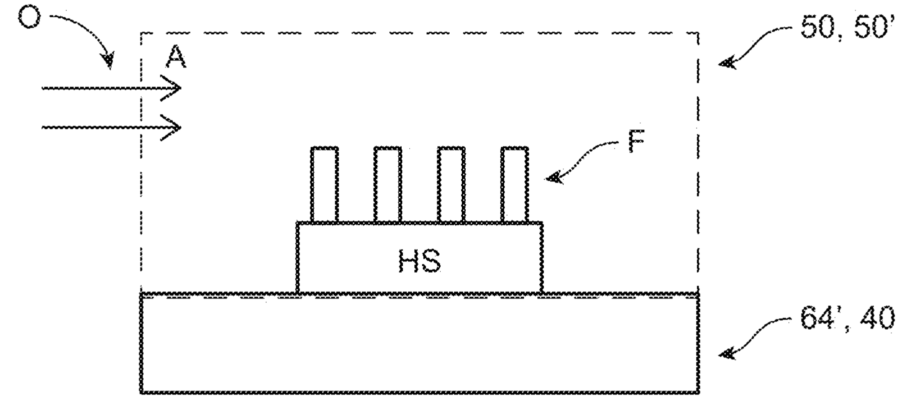
FIGS. 7A-7C are schematic views of cooling units for use with the portable nuclear power system of FIGS. 1-6.

FIG. 7A shows a schematic view of one example of a cooling unit 50, 50'. The cooling unit 50, 50' is a passive unit and includes a heat sink HS with one or more (e.g., multiple) fins F. Airflow A can enter via one or more openings O in the cooling unit 50. 50' and flow past the heat sink HS and fins F to remove heat from the heat sink HS.

Figure 7B:
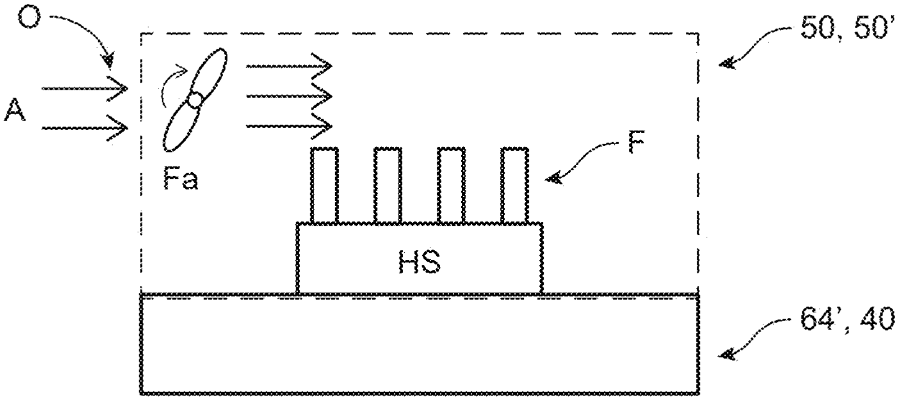

FIG. 7B shows a schematic view of one example of a cooling unit 50, 50'. The cooling unit 50, 50' is an active unit and includes a heat sink HS with one or more (e.g., multiple) fins F. Airflow A is drawn into the cooling unit 50, 50' via one or more openings O thereof and is driven by a fan Fa over the heat sink HS and fins F to remove heat from the heat sink HS.

Figure 7C:
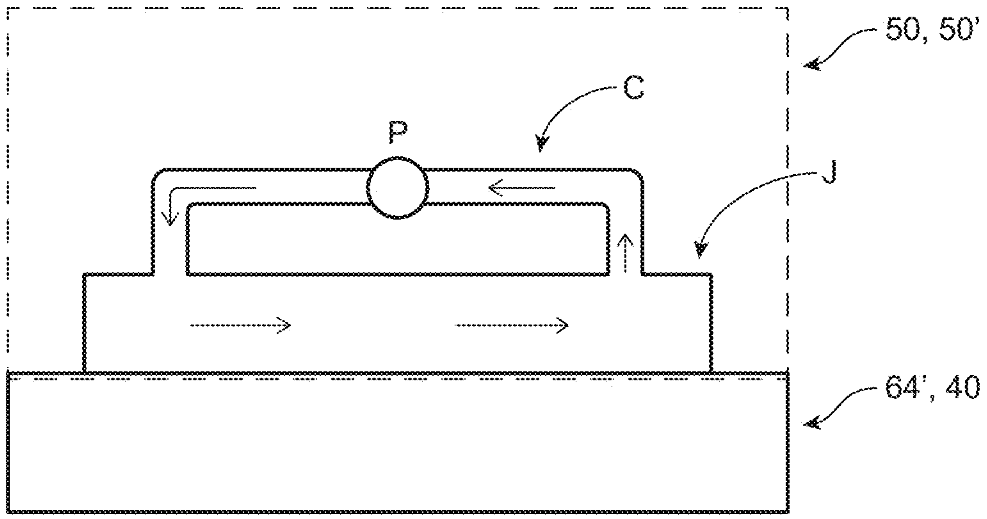

FIG. 7C shows a schematic view of one example of a cooling unit 50, 50'. The cooling unit 50, 50' can include a liquid (e.g., water) jacket J. the liquid is recirculated through the jacket J via a conduit C, the liquid flow driven by a pump P.

ADDITIONAL EMBODIMENTS

In embodiments of the present disclosure, a portable nuclear reactor may be in accordance with any of the following clauses:

Clause 1: A portable nuclear power system, comprising:
- a nuclear reactor comprising
  - a core comprising a vessel housing a nuclear fuel that produces radiation,
  - a sleeve of a high temperature moderator material disposed circumferentially about the core, and
  - a neutron screen disposed circumferentially about the sleeve;
- one or more thermal photovoltaic panels circumferentially arranged around the neutron screen, the one or more thermal photovoltaic panels configured to absorb thermal radiation received from the high temperature moderator material via the neutron screen and to generate electricity therefrom; and
- one or more cooling units in thermal communication with the one or more thermal photovoltaic panels, the one or more cooling units being operable to cool the thermal photovoltaic panels.

Clause 2: The system of Clause 1, wherein the nuclear fuel comprises Triso.

Clause 3: The system of any preceding clause, wherein the high temperature moderator material comprises graphite.

Clause 4: The system of any preceding clause, wherein the one or more cooling units is a passive cooling unit.

Clause 5: The system of any of Clauses 1-3, wherein the one or more cooling units is an active cooing unit.

Clause 6: The system of any of Clauses 1-3, wherein the one or more cooling units comprises a water jacket through which water is circulated by a pump.

Clause 7: The system of any preceding clause, wherein the one or more thermal photovoltaic panels is a plurality of thermal photovoltaic panels arranged circumferentially about the neutron screen.

Clause 8: The system of any preceding clause, wherein the plurality of thermal photovoltaic panels are spaced apart from the neutron screen.

Clause 9: The system of any preceding clause, wherein at least one of the one or more thermal photovoltaic panels are disposed in the core.

Clause 10: The system of any preceding clause, further comprising one or more heat pipes disposed in the core and configured to transfer heat toward an outer circumference of the core.

Clause 11: A portable nuclear power system, comprising:
- a nuclear reactor comprising
  - a core comprising a vessel housing a nuclear fuel that produces radiation,
  - a sleeve of a high temperature moderator material disposed circumferentially about the core, and
  - a neutron screen disposed circumferentially about the sleeve;

a flow loop operable to recirculate a gas through the core to cool the core;

a Stirling engine comprising a hot side heat exchanger in thermal communication with the gas in the flow loop and configured to receive heat therefrom; and a cooling unit in thermal communication with a cold side heat exchanger of the Stirling engine, the Stirling engine configured to generate electricity.

Clause 12: The system of Clause 11, wherein the nuclear fuel comprises Triso.

Clause 13: The system of any of Clauses 11-12, wherein the high temperature moderator material comprises graphite.

Clause 14: The system of any of Clauses 11-13, wherein the gas is helium.

Clause 15: The system of any of Clauses 11-14, wherein the Stirling engine comprises:

a cylinder, a piston movable within the cylinder, a flywheel operatively coupled to the piston by a lever, a working fluid disposed in the cylinder, the working fluid configured to move the piston in one direction when heated by the hot side heat exchanger and the piston configured to move in an opposite direction when the working fluid is cooled by the cold side heat exchanger, the Stirling engine configured to generate electricity via rotation of the flywheel caused by movement of the piston within the cylinder.

Clause 16: They system of any of Clauses 11-15, wherein the cooling unit comprises a water jacket through which water is circulated by a pump.

Clause 17: The system of any of Clauses 11-15, wherein the cooling unit is a passive cooling unit.

Clause 18: The system of any of Clauses 11-15, wherein the cooling unit is an active cooing unit.

Clause 19: A portable nuclear power system, comprising:

a nuclear reactor comprising a core comprising a vessel housing a nuclear fuel that produces radiation, a sleeve of a high temperature moderator material disposed circumferentially about the core, and a neutron screen disposed circumferentially about the sleeve;

means for generating electricity from heat received from the nuclear reactor; and one or more cooling units in thermal communication with said means and operable to cool said means.

Clause 20: The system of Clause 19, wherein the nuclear fuel comprises Triso.

Clause 21: The system of any of Clauses 19-20, wherein the high temperature moderator material comprises graphite.

Clause 22: The system of any of Clauses 19-21, wherein the one or more cooling units is chosen from a group consisting of a passive cooling unit, an active cooling unit and a water jacket through which water is recirculated by a pump.

Clause 23: The system of any of Clauses 19-22, wherein said means comprises one or more thermal photovoltaic panels disposed in the core.

Clause 24: The system of any of Clauses 19-23, further comprising one or more heat pipes disposed in the core and configured to transfer heat toward an outer circumference of the core.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A portable nuclear power system, comprising:
a nuclear reactor comprising
a nuclear reactor core comprising a vessel housing a nuclear fuel that produces radiation,
a sleeve of a high temperature moderator material disposed circumferentially about the nuclear reactor core, and
a neutron screen disposed circumferentially about the sleeve;
one or more thermal photovoltaic panels circumferentially arranged around the neutron screen, the one or more thermal photovoltaic panels configured to absorb thermal radiation received from the high temperature moderator material via the neutron screen and to generate electricity therefrom; and
one or more cooling units in thermal communication with the one or more thermal photovoltaic panels, the one or more cooling units being operable to cool the thermal photovoltaic panels.

2. The system of claim 1, wherein the nuclear fuel comprises Triso.

3. The system of claim 1, wherein the high temperature moderator material comprises graphite.

4. The system of claim 1, wherein the one or more cooling units is a passive cooling unit.

5. The system of claim 1, wherein the one or more cooling units is an active cooing unit.

6. The system of claim 1, wherein the one or more cooling units comprises a water jacket through which water is circulated by a pump.

7. The system of claim 1, wherein the one or more thermal photovoltaic panels is a plurality of thermal photovoltaic panels arranged circumferentially about the neutron screen.

8. The system of claim 7, wherein the plurality of thermal photovoltaic panels are spaced apart from the neutron screen.

9. The system of claim 1, wherein at least one of the one or more thermal photovoltaic panels are disposed in the core.

10. A portable nuclear power system, comprising:
a nuclear reactor comprising
a nuclear reactor core comprising a vessel housing a nuclear fuel that produces radiation,
one or more heat pipes disposed in the core;
a sleeve of a high temperature moderator material disposed circumferentially about the nuclear reactor core, and
a neutron screen disposed circumferentially about the sleeve;
one or more thermal photovoltaic panels circumferentially arranged around the neutron screen, the one or more thermal photovoltaic panels configured to absorb thermal radiation received from the high temperature moderator material via the neutron screen and to generate electricity therefrom; and
one or more cooling units in thermal communication with the one or more thermal photovoltaic panels, the one or more cooling units being operable to cool the thermal photovoltaic panels.

11. The system of claim 10, wherein the one or more cooling units is a passive cooling unit.

12. The system of claim 10, wherein the one or more cooling units is an active cooing unit.

13. The system of claim 10, wherein the one or more cooling units comprises a water jacket through which water is circulated by a pump.

14. The system of claim 10, wherein at least one of the one or more thermal photovoltaic panels are disposed in the core.

15. The system of claim 10, wherein the nuclear fuel comprises Triso.

16. A portable nuclear power system, comprising:
- a nuclear reactor comprising
  - a nuclear reactor core comprising a vessel housing a nuclear fuel that produces radiation,
  - a sleeve of a high temperature moderator material disposed circumferentially about the nuclear reactor core, and
  - a neutron screen disposed circumferentially about the sleeve;
- one or more thermal photovoltaic panels circumferentially arranged around the neutron screen, the one or more thermal photovoltaic panels configured to absorb thermal radiation received from the high temperature moderator material via the neutron screen and to generate electricity therefrom;
- one or more cooling units in thermal communication with the one or more thermal photovoltaic panels, the one or more cooling units being operable to cool the thermal photovoltaic panels; and
- wherein the neutron screen is configured to absorb neutrons to shield the one or more thermal photovoltaic panels from nuclear radiation.

17. The system of claim 16, wherein the one or more cooling units is a passive cooling unit.

18. The system of claim 16, wherein the one or more cooling units is an active cooing unit.

19. The system of claim 16, wherein the one or more cooling units comprises a water jacket through which water is circulated by a pump.

20. The system of claim 16, wherein at least one of the one or more thermal photovoltaic panels are disposed in the core.

21. The system of claim 16, wherein the nuclear fuel comprises Triso.

22. The system of claim 16, wherein the high temperature moderator material comprises graphite.

23. The system of claim 16, wherein the one or more thermal photovoltaic panels are circumferentially arranged around the neutron screen at a same elevation as the neutron screen.

24. The system of claim 16, wherein the nuclear reactor is configured to generate between 0.5 MW and 10 MW of power.

* * * * *